United States Patent [19]

Stucki

[11] 4,396,301

[45] Aug. 2, 1983

[54] SENSING DEVICE FOR DETECTING CHANGES IN VARIABLE QUANTITIES

[75] Inventor: Alfred B. Stucki, Brigham City, Utah

[73] Assignee: Thiokol Corporation, Newtown, Pa.

[21] Appl. No.: 283,594

[22] Filed: Jul. 15, 1981

[51] Int. Cl.³ ............. G01K 3/00; G01K 5/50; G01K 5/36
[52] U.S. Cl. ............. 374/188; 235/92 MT; 235/205; 235/322; 235/557; 235/206; 235/25
[58] Field of Search ............. 374/188, 166, 171, 170; 340/870.17; 364/557; 235/92 ST; 73/733; 200/83 L, 81.8; 335/207; 337/322

[56] References Cited

U.S. PATENT DOCUMENTS

| | | | |
|---|---|---|---|
| 682,084 | 9/1901 | Jobson | 374/188 |
| 2,018,220 | 10/1935 | Morrison | 374/188 |
| 2,356,612 | 8/1944 | Pfaff et al. | 374/188 X |
| 2,626,755 | 1/1953 | Tidd | 200/81.8 |
| 2,680,222 | 6/1953 | Schwieg | 374/205 |
| 3,187,131 | 6/1965 | Blase | 200/83 L X |
| 3,505,872 | 4/1970 | Marlof | 374/188 X |
| 3,623,051 | 11/1971 | Juno et al. | 200/83 L X |
| 3,656,078 | 4/1972 | Domenico | 337/322 X |
| 3,656,082 | 4/1972 | Beck | 335/205 X |
| 3,724,534 | 4/1973 | Weatherston | 374/188 |
| 3,786,211 | 1/1974 | Popp | 200/83 L X |
| 3,859,651 | 1/1975 | Thomas, Jr. | 116/215 X |
| 3,875,800 | 4/1975 | Stockton | 200/81.8 X |
| 3,947,692 | 3/1976 | Payne | 374/188 X |
| 4,061,901 | 12/1977 | Saunders et al. | 73/321 X |
| 4,112,764 | 9/1978 | Turner | 374/142 |
| 4,150,573 | 4/1979 | Iinuma et al. | 235/92 MT |
| 4,181,957 | 1/1980 | Pinckaers | 235/92 MT |
| 4,214,152 | 7/1980 | Hess | 235/92 ST X |
| 4,292,840 | 10/1981 | Nguyen | 200/81.8 X |
| 4,298,947 | 11/1981 | Tamura et al. | 374/170 |

Primary Examiner—Daniel M. Yasich
Attorney, Agent, or Firm—Thomas W. Brennan; Gerald K. White

[57] ABSTRACT

A system for sensing or detecting changes in and accumulating data relating to variable quantities or conditions, for example temperature, is disclosed. In one instance, the system sensor is a mercury tube thermometer modified with conductors or contacts embedded in the glass walls of the mercury tube. As the temperature rises, the conductive material rises and performs a switching function with the embedded contacts closing an electrical circuit to which the contacts are connected. The circuit components include plurality of logic gates the inputs of which are connected to the switching contacts in a manner such that their outputs are singularly true in a sequence corresponding to the direction of temperature change. In another instance the sensor is a bimetallic strip, coil or thermal Bourdon tube and an arm or pointer needle mounted on an end of the strip or tube rotates in response to changes in the temperature being sensed. A permanent magnet on the end of the arm, opens or closes, in a sequence corresponding to the direction of change in temperature, magnetic reed switches positioned along the path of the moving magnet. The switch closings and openings provide input binary signals to the logic devices connected thereto, the outputs of which when connected to a suitable register or up-down counter result in the transmission of accumulated data stored therein.

19 Claims, 6 Drawing Figures

SENSING DEVICE FOR DETECTING CHANGES IN VARIABLE QUANTITIES

BACKGROUND OF THE INVENTION

1. Field of the Invention

This invention relates to systems for sensing changes in and accumulating data relating to variable entities, quantities or conditions. More particularly this invention relates to systems of this kind wherein a sensing device utilized to sense or detect the changes involved responds thereto with a directional movement, which movement causes closures or openings in electrical circuits thereby generating binary input signals to a plurality of logic devices connected in the circuits, the outputs of which are representative, in a sequence, of the direction of change taking place.

2. Description of the Prior Art

It is well known to use electrical contacts in conjunction with a mercury thermometer to open and close electric circuits. For example, U.S. Pat. No. 2,519,853 discloses a thermostatic control utilizing a mercury thermometer having vertically spaced electrical contacts extending through the glass walls of the thermometer. When the mercury rises and covers or "wets" the contacts, a circuit is closed; when the mercury falls, the contacts are uncovered, or "dewetted" and the circuit is opened. U.S. Pat. No. 1,912,154 discloses a mercurial thermometer having contact points connected to a plurality of lead wires and resistors in a circuit of an electric fan for controlling the operation of the fan. U.S. Pat. No. 682,084 similarly describes a thermometer with embedded contacts in a resistance circuit wherein mercury, upon rising, covers contact pairs, and inserts incrementally, resistance into the thus closed electrical circuit. U.S. Pat. No. 2,356,612 discloses a temperature responsive control device including a thermometer with contacts embedded in the glass tube thereof which are connected through a rotary, manually operated switch to a motor-compressor or like device of a refrigeration system to control the operation thereof. U.S. Pat. No. 1,443,395 discloses a circuit in which lamps are operated to indicate the temperature at a remote location. U.S. Pat. No. 2,816,422 discloses a device wherein the temperature which is detected at different locations is that of the material in a bulk storage site. U.S. Pat. No. 3,505,872 discloses a device for effecting a readout in a digital counter of a measurement of temperature wherein a change in temperature produces a corresponding change in the output of an electronic oscillator. U.S. Pat. No. 489,259 discloses a thermometer with contacts embedded in the glass tube walls to set off an alarm indicating a predetermined maximum temperature has been reached.

Other prior patents have been granted over the years which are directed to temperature and/or pressure sensing devices utilizing Bourdon tubes with arms or needles attached which carries a permanent magnet on the extreme end thereof. The magnet actuates magnetic reed switches to open and close electric circuits. Similar devices are disclosed in U.S. Pat. Nos. 3,273,139 and 3,656,082. In U.S. Pat. No. 3,656,082, a thermostat is disclosed in which the temperature or pressure sensitive element is a bimetal strip in the form of a coil with a permanent magnet mounted on the end of the coil strip in cantilever fashion, providing a magnetic reed switch for opening and closing an electric circuit. U.S. Pat. No. 3,976,963 discloses an array of magnetic reed switches which are operated to open and close electric circuits by a moving permanent magnet. Other U.S. patents disclosing related subjects are: U.S. Pat. No. 3,464,047 for a magnetic reed switch operative by the melting of a frozen liquid in which they are embedded; U.S. Pat. No. 3,721,929 for a battery of reed switches in side-by-side array operated by a moving magnet; U.S. Pat. No. 3,859,651 for a plurality of magnetic reed switches operable to produce a visual display of the degrees of angle of a boom member of a lifting crane; and, U.S. Pat. No. 3,419,731 for a plurality of reed switches arranged on a curved path. U.S. Pat. No. 4,061,901 discloses a telemetering system in which a magnet is supported on a rotating shaft and, in rotating, closes and opens electrical circuits by closing and opening magnetic reed switches, or sensors, positioned along the magnet's path of rotation. Each switch or sensor is connected to an input of two different logic devices, i.e., flip-flops so that data bits stored in each flip-flop are determined by the sequential activation of two or more of the sensors. Each data bit stored in a flip-flop is a digit of a three-digit binary code, and the output of each flip-flop is connected to an AND-OR-INVERTER, the output of which, connected to a binary coded decimal (BCD) up-down counter, determines whether the counter counts positively or negatively. Thus, the signals produced by the switches or sensors are fed to the counter via the inverter and are stored and counted therein. The counter includes a "clock" which receives a pulse or voltage through an increment line activated in response to changes in the sensors. The information stored in the counter is then dispensed or recorded as desired. In one application disclosed the information is automatically transmitted by radio whenever a change in that information occurs, thus being useful in connection with remotely located information gathering or accumulating devices. It will be appreciated that the system disclosed in this patent is ideally suited for application of the present invention and such is contemplated.

Thus, it is evident that many prior art devices are known which utilize mercury column and rotating arm thermometric or pressure sensitive devices to open and close electric circuits for controlling the operation of, or measuring the temperature or pressure of implements, devices and systems and their environments. However, nowhere in this prior art is it known to use such sensing devices in an incremental temperature data accumulator system comprising logic circuits with connected gating devices to produce a binary signal code of different binary significances in a sequence representative of the changing quantities being detected at a remote location, i.e., increasing (up) or decreasing (down).

SUMMARY OF THE INVENTION

Among the objects of the invention is to provide a system for sensing changes in and accumulate incremental data relating to variable quantities or conditions such as temperature and pressure for use in remote locations from which the data accumulated can be transmitted upon a specified increment of change in or upon reaching a specified level of said temperature or pressure.

Another object of the invention is to provide a system of the character described which is simple in construction, has relatively low operational and standby power requirements and is adaptable with relatively little effort to a telemetry system.

An additional object of the invention is to provide a system of the character described which utilizes logic circuits to produce and distribute input and output binary signals which are representative of the direction of change in the temperature or pressure being sensed, i.e., whether increasing or decreasing, and in which the circuit components are low cost standard electronic gating devices.

Still another object of the invention is to provide a system of the character referred to wherein the sensor is a thermosensing device capable of undergoing movement responsive to changes in temperature, which movement performs a switching function to close and open electrical circuits containing a plurality of logic gating devices to produce binary signals of different significances including output signals, said output signals being connected in such a manner that the binary signals produced become singularly true in a sequence corresponding to the direction of temperature change, i.e., increasing or decreasing, and which when connected to a suitable register and event triggering device in a telemetry system, each switch closure or opening will increment or decrement an accumulator and cause the accumulated or incremental or decremental data to be transmitted only when a change in temperature occurs.

In accomplishing these and other objects, there is provided in a preferred embodiment a sensing and data accumulating system in which a mercury-in-glass thermometer, used to sense changes in a variable quantity such as temperature, has a plurality of normally open, groundable conductors embedded in the glass so that the mercury, in rising and falling in accordance with increasing or decreasing temperature, covers or uncovers the conductors in a switching action which closes or opens an electric circuit producing signals of binary form or significance. The signals can then be inputed to a series of logic gates in logic circuits connected to the conductors in such a manner that the outputs of the gates are representative in a sequence corresponding to the direction of temperature change.

There is further provided a system of the type referred to wherein the sensing device is a bourdon tube or bimetal strip with an arm or needle rotatably attached. A magnet on one end of the arm sweeps past a series of magnetic reed switches as the arm rotates to close, or ground them or to open them depending on whether the temperature is increasing or decreasing, thereby closing or opening an electric circuit. The switches are arranged in parallel branches of every third switch in such a manner that the grounding, or closing of one of the switches in a branch closes or grounds the entire branch producing a "branch" output signal of binary form or significance and which, when connected to a register and event-triggered telemetry system, each successive switch closing will result in transmission of accumulated incremental temperature data.

DESCRIPTION OF THE PREFERRED EMBODIMENTS

While in the following description the invention is presented with reference to detecting and sensing and accumulating data relative to changes in temperature or pressure as variable quantities, it should be apparent that it has broader application and is readily adapted for use, with little or no modification, to any situation involving changing quantities, entities or conditions. Thus, sensors can be advantageously used with the inventive logic circuits to sense and detect changes in water levels due to rainfall or melting snow, or of levels of loose solid materials such as grain, metal particles and the like thereby eliminating much or all of the complex mechanical means presently used and which often required many moving and relatively more expensive parts.

Figure 1:
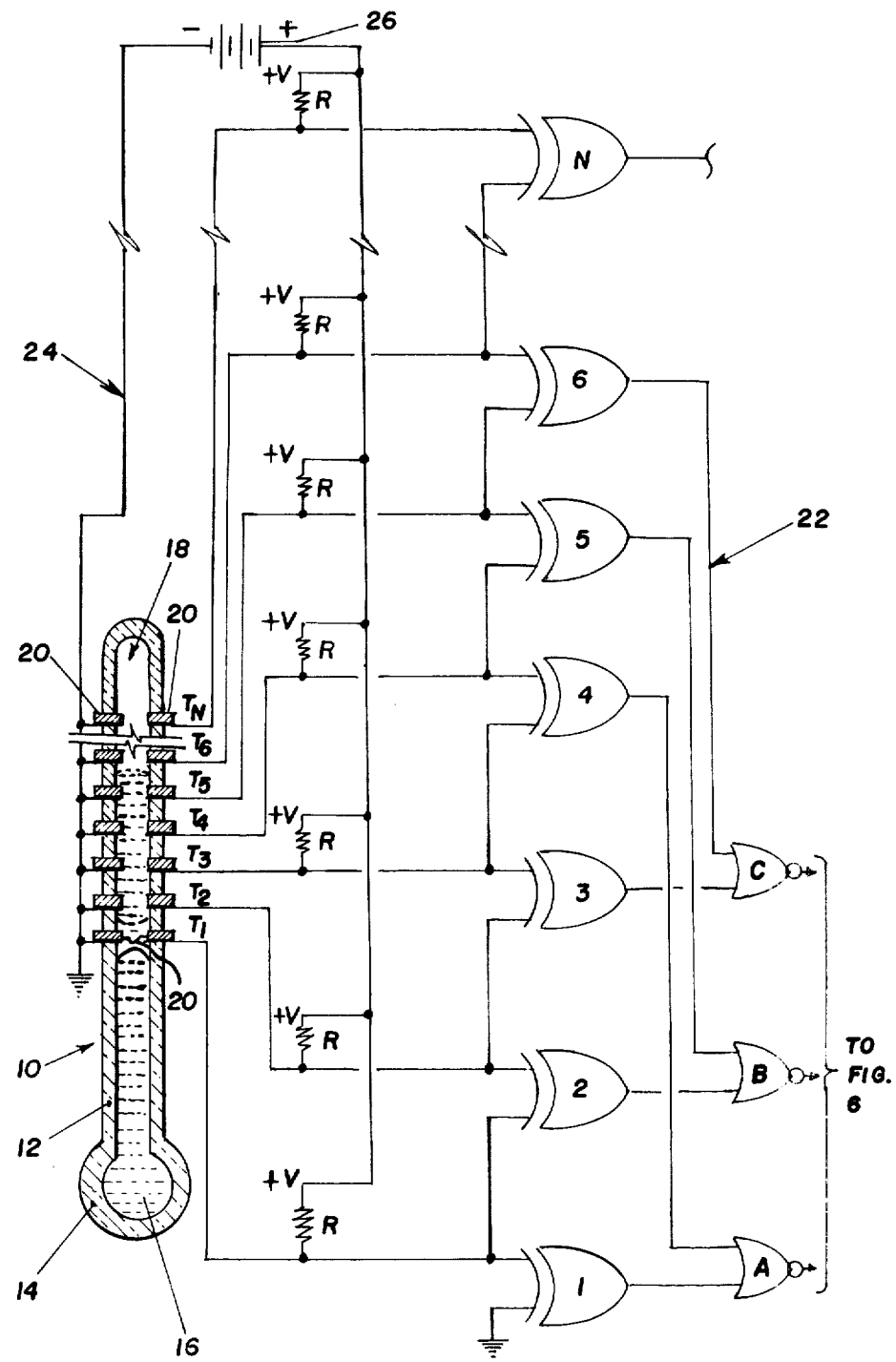
FIG. 1 is a block diagram of the circuit of the preferred embodiment of the invention.

Accordingly, in FIG. 1 a thermometric sensing device 10 is positioned to detect and indicate temperature in the locale or environment in which it may be placed. As shown, somewhat diagrammatically, sensor 10 is a modified form of mercurial thermometer which may include a scale of degrees (not shown) having a glass tube 12, a bulb portion 14 in which a conductive material 16 such as liquid mercury and the like is contained, and a closed, evacuated top portion 18. Embedded in the walls of glass tube 12 at selected levels generally corresponding to the degrees of temperature on the scale if used, are a series of conductors, or groundable contacts 20 (designated T . . . Tn) arranged in pairs which, as will be described in more detail hereinafter, constitute electrical switches capable of electrically closing or opening one or more of the connected circuits 22 by the rising and falling of mercury 16 which will occur according to whether or not the temperature being sensed is changing.

Each contact pair 20 is connected to a ground circuit 24 on one side and to an electrical power source in the form of a battery 26 through parallel connected pull-up resistors R on the other side. Circuit 22 contains a plurality of interconnected logic devices designated, from bottom to top in FIG. 1, 1 through N which are Exclusive-OR gates having at least two input points one of which is connected to a respective one of contacts 20, as shown. Thus, $T_1$ is inputted to gate 1, $T_2$ to gate 2, and so on with $T_n$ inputted to gate N. The remaining gate input is connected to the previous gate contact input except for gate 1 which is grounded. The Exclusive-OR gates have single outputs each of which is connected to one of a series of NOR gates A, B and C as inputs thereto, gates 1 and 4 going to NOR gates A, gates 2 and 5 to B, and 3 and 6 to C.

In FIG. 1, thermometer 10 is shown in an environment wherein the temperature, as indicated by mercury 16, has not yet reached a level sufficiently high to cover or "wet" switch or contact pair $T_1$ and all switches T are open. Under this condition, the inputs to Exclusive-OR gate 1 will be a low or ground signal of least or second binary significance (0) and a high or +V signal of first binary significance (1). These inputs will result in a logic (1) output for gate 1 which in turn will produce a logic (0) at NOR gate A. The inputs to all other Exclusive-OR gates 2 to 6, will be logic (1) and their outputs will all be a logic (0), resulting in a logic (1) at NOR gates B and C.

In operation of the FIG. 1 embodiment and assuming a rise in temperature sufficient to cause mercury 16 to move upwardly in tube 12 to a level between $T_1$ and $T_2$, $T_1$ will close and a low or (0) binary signal will be applied to the inputs of Exclusive-OR gates 1 and 2. Since both inputs to gate 1 are now (0), its output will go to (0) resulting in a logic (1) output at gate A. Since gate 2 inputs will be a logic (0) from gate 1 and a logic (1) from battery 26 via pull-up resistor R, its output will go to (1) resulting in an (0) output at NOR gate B. Since the remaining Exclusive-OR gates 3 to 6 will all have logic (1) inputs, their outputs will be (0) and NOR gate C output will remain at (1). As the temperature continues to rise and $T_3$ to $T_6$ are closed successively there will be a (1) output at only that Exclusive-OR gate where all lower switches or contacts 20 are closed and all higher ones are open. Thus, a closed switch, resulting in grounding of its contacts 20, will supply a binary (0) or ground to a particular Exclusive-OR gate, whereas an open switch will supply a binary (1) or +V to the Exclusive-OR gate. Table 1 below is a truth table constructed for all switches, $T_1$ through $T_6$ functions and for the functions and corresponding binary output values of Exclusive-OR gates 1 through 6. In addition, Table 1 gives the corresponding functions and binary output values of NOR gates A, B and C and illustrates that as temperature increases, these outputs become low or (0) in a sequence corresponding to the direction of temperature change, i.e., A to B, B to C and C to A, signifying increase, or "up" and B to A, A to C and C to B, signifying decrease, or "down."

TABLE 1

| SWITCHES | | | | | | OUTPUTS EX-OR GATES | | | | | | | OUTPUTS-NOR GATES | | |
|---|---|---|---|---|---|---|---|---|---|---|---|---|---|---|---|
| $T_1$ | $T_2$ | $T_3$ | $T_4$ | $T_5$ | $T_6$ | 1 | 2 | 3 | 4 | 5 | 6 | N | A | B | C |
| 1 | 1 | 1 | 1 | 1 | 1 | 1 | 0 | 0 | 0 | 0 | 0 | 0 | 0 | 1 | 1 |
| 0 | 1 | 1 | 1 | 1 | 1 | 0 | 1 | 0 | 0 | 0 | 0 | 0 | 1 | 0 | 1 |
| 0 | 0 | 1 | 1 | 1 | 1 | 0 | 0 | 1 | 0 | 0 | 0 | 0 | 1 | 1 | 0 |
| 0 | 0 | 0 | 1 | 1 | 1 | 0 | 0 | 0 | 1 | 0 | 0 | 0 | 0 | 1 | 1 |
| 0 | 0 | 0 | 0 | 1 | 1 | 0 | 0 | 0 | 0 | 1 | 0 | 0 | 1 | 0 | 1 |
| 0 | 0 | 0 | 0 | 0 | 1 | 0 | 0 | 0 | 0 | 0 | 1 | 0 | 1 | 1 | 0 |
| 0 | 0 | 0 | 0 | 0 | 0 | 0 | 0 | 0 | 0 | 0 | 0 | 1 | 0 | 1 | 1 |
| 0 | 0 | 0 | 0 | 0 | 1 | 0 | 0 | 0 | 0 | 0 | 1 | 0 | 1 | 1 | 0 |
| 0 | 0 | 0 | 0 | 1 | 1 | 0 | 0 | 0 | 0 | 1 | 0 | 0 | 1 | 0 | 1 |
| 0 | 0 | 0 | 1 | 1 | 1 | 0 | 0 | 0 | 1 | 0 | 0 | 0 | 0 | 1 | 1 |
| 0 | 0 | 1 | 1 | 1 | 1 | 0 | 0 | 1 | 0 | 0 | 0 | 0 | 1 | 1 | 0 |
| 0 | 1 | 1 | 1 | 1 | 1 | 0 | 1 | 0 | 0 | 0 | 0 | 0 | 1 | 0 | 1 |
| 1 | 1 | 1 | 1 | 1 | 1 | 1 | 0 | 0 | 0 | 0 | 0 | 0 | 0 | 1 | 1 |

An additional feature of the invention of the preferred, or FIG. 1 embodiment will now be described. As mentioned previously herein, there will be an output of first binary significance from only one Exclusive-OR gate at any one time. This is so, of course, only so long as conducting material 16 remains contiguous, which generally is the case. However, should a separation occur, as indicated by the dash line miniscuses in FIG. 1 wherein mercury 16 has separated below $T_1$ which is open, leaving $T_2$ through $T_5$ closed. In this situation, that is, a separation occurring which is greater than the distance between contacts 20, two or more Exclusive-OR gates would go high or have binary (1) outputs simultaneously thereby indicating a faulty output. On the other hand, occurrences such as these can be useful particularly where it is specifically desired to sense the separation of mercury or any conductive fluid substances and in measuring or detecting the level or movement of any conductive fluid, for example, battery electrolyte level, detection of voids in a coal or metal slurry pipe line and levels of molten sodium or lithium coolants in closed-cycle heat exchangers and the like. In addition, by replacing contacts 20 or switches T with brushes, the usefulness of the invention can be extended to the detection of movement in solid conductors. Table 2 is a truth table of these functions corresponding to the condition of a separation occurring between $T_1$ and $T_2$ in FIG. 1.

TABLE 2

| SWITCHES T | | | | | | EXCLUSIVE-OR OUTPUTS | | | | | | NOR GATE OUTPUTS | | |
|---|---|---|---|---|---|---|---|---|---|---|---|---|---|---|
| $T_1$ | $T_2$ | $T_3$ | $T_4$ | $T_5$ | $T_6$ | 1 | 2 | 3 | 4 | 5 | 6 | A | B | C |
| 1 | 0 | 0 | 0 | 0 | 1 | 1 | 1 | 0 | 0 | 0 | 1 | 0 | 0 | 0 |

Figure 2:
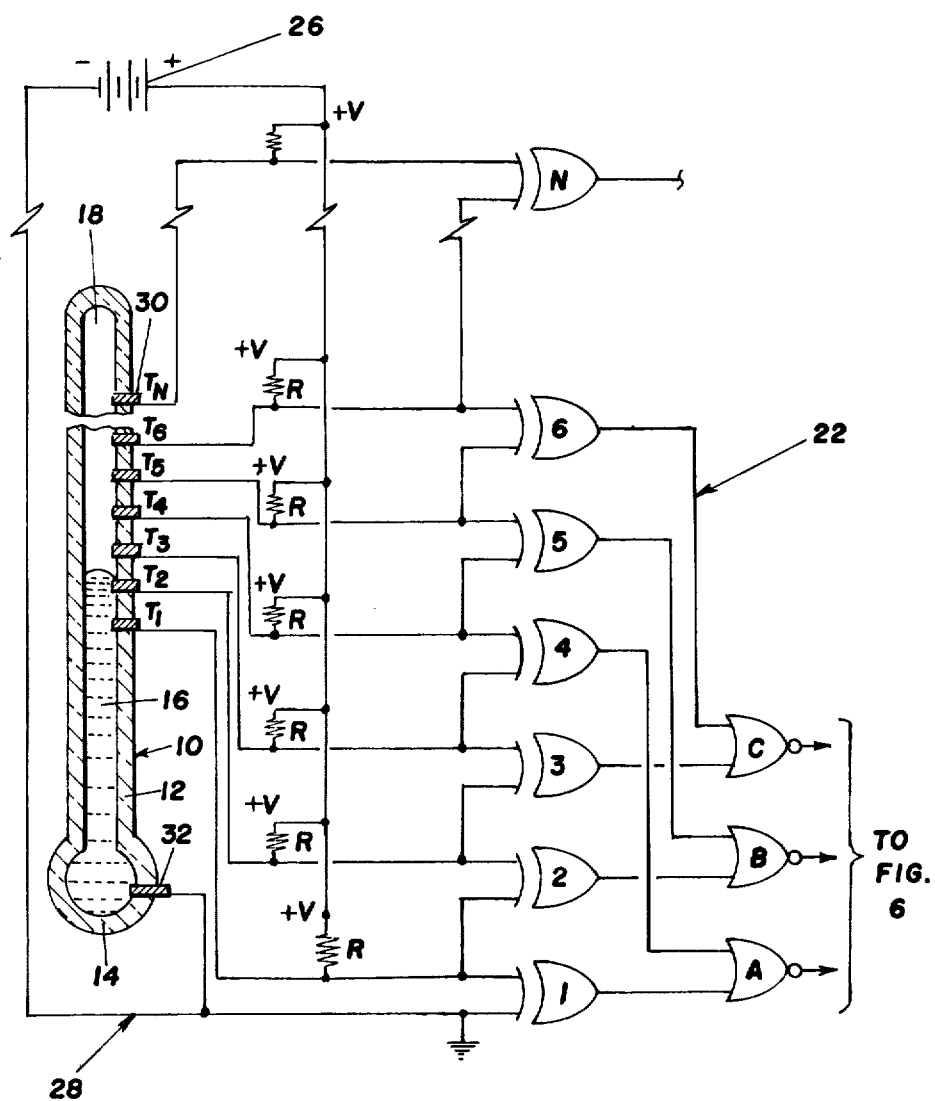
FIG. 2 is a block diagram of a circuit of a slightly modified form of the invention.

Referring now to FIG. 2, a slightly modified form of the invention is depicted in which a plurality of single contacts 30 are employed together with an additional contact 32 for directly grounding mercury 16 through a ground circuit 28. In this embodiment, a more compact device is permitted from which cost savings can be realized, both with regard to circuitry, which is less complex, and the need for fewer parts such as a reduction in the number of contacts required. Also, single contacts, one per switch T, permits closer placement thereof along the temperature scale thereby reducing the size of the increment or interval of temperature being detected or sensed, thereby improving accuracy and precision of measurement. In all other respects, operation of this embodiment is identical to the FIG. 1 embodiment; however, should a separation in mercury 16 occur, detection thereof is not possible since contacts 30 are groundable only through mercury 16. In this case, though one or more contacts 30 become covered by mercury 16, the contacts involved will not be grounded and the respective switch "closing" will not occur. On the other hand, all switches T in the separated region will immediately "open" and the outputs of the affected Exclusive-OR gates will go to (0) giving an indication of a sudden change (drop) in temperature. Hence, the occurrence of separation might be *suspected* as a cause of such change and would be indicated by a corresponding change in the binary coded output. However, at no time would two or more Exclusive-OR gates be true, i.e., have a binary value of (1) simultaneously, as would be the case in the preferred embodiment of FIG. 1.

Figure 3:
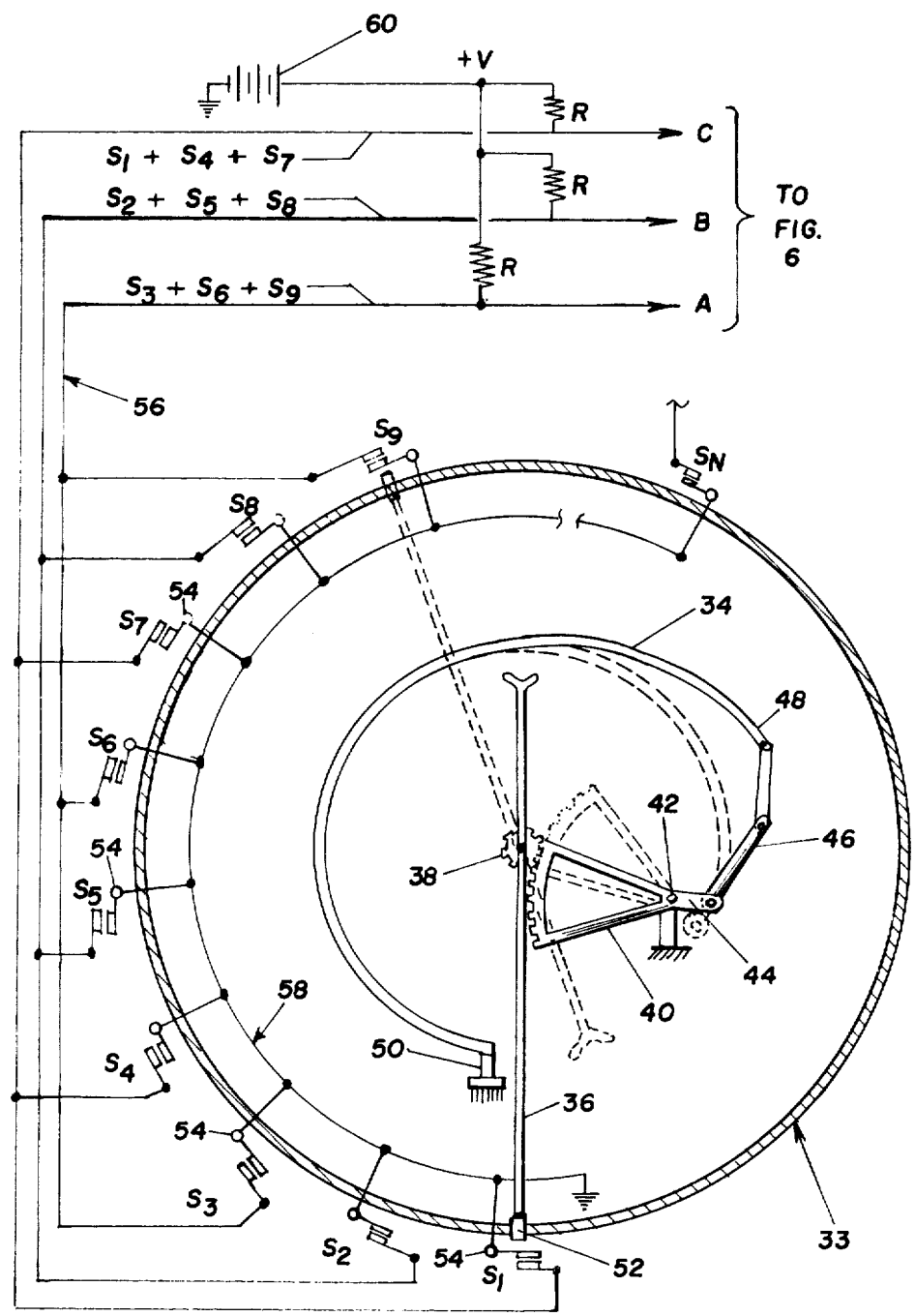
FIG. 3 is a diagrammatic plan view of a temperature sensing means of another embodiment of the invention including a schematic diagram of the electric circuit used therewith.

Turning now to FIG. 3, an additional embodiment of the invention is shown in which a thermosensing device or sensor element 33 in the form of a bimetallic coil or thermal Bourdon tube 34 has a rotating indicating arm or pointer 36 attached thereto on a central pin connected, rotatable gear pinion or cog 38. Pinion 38 is mounted for rotation and engaged by a rotating gear sector or bell crank 40 rotatably mounted on a pin connector 42 through the extension 44 thereof. Extension 44 of bell crank 40 is connected to an articulated link or linking arm 46 which in turn is connected to the free end 48 of bimetal strip or bourdon tube 34. Thus, in operation, as the temperature which is being measured changes, bimetal coil or tube 34 will move outwardly or inwardly, free end 48 thereof moving on a generally arcuate path about the fixed end 50 of coil or tube 34, outwardly with increasing temperature and inwardly with decreasing temperature. Free end 48 outward movement causes rotation of bell crank 40 through linking arm 46 which in turn causes rotation of pinion or cog 38 and arm or pointer 36 affixed thereto. A permanent magnet 52 carried on the outer extreme end of arm 38 sweeps past a series or plurality of magnetic reed switches 54, designed, in FIG. 3, $S_1 \ldots S_n$, and the number of switches 54, the selection of element 32 and the length of arm 38 will be determined by the temperature range, the accuracy of measurement required and the size of the temperature increment or change of temperature desired. As magnet 52 moves past each switch 54, as it comes into alignment therewith, the respective switch will be actuated to close and a digital or binary signal (0) will be produced. As the temperature changes up or down, magnet 52 will move away from the previously closed switch and the latter will reopen producing a binary (1).

Every third switch 54 is connected in parallel in a circuit 56, one side of each switch being grounded via a circuit 58 and the other side being connected to a power source or battery 60 through suitable pull-up or load resistors R. Circuit 56 is a multiple branch, parallel switching circuit connected in such a manner that a closing of any one, or of all switches 54 in a branch causes the entire branch to be grounded producing a binary low signal of (0) at the output of the branch. For example, in FIG. 3, $S_3$, $S_6$ and $S_9$, which are connected in a parallel branch designated A will produce a (0) at output A if any one or all of these switches close and a high, +V or (1) only if all of them are open. In the latter event current from battery 60 will cease to flow through the branch resistor R directly to ground, and the voltage will rise producing a (1) at A. Similarly, switches $S_2$, $S_5$ and $S_8$ are parallel connected in a branch designated B and $S_1$, $S_4$ and $S_7$ in a branch designated C such that a closing of any one or all of the switches in the respective branch circuits will produce a (0) or ground signal at the respective B or C output.

Conversely, each branch will have a high, or binary (1) output only when all switches 54 are open, and the branches will each function as the electronic equivalent of a NOR gate having an output A, B or C. Table 3 summarizes these functions and results.

TABLE 3

| SWITCH 54 POSITIONS | | | | | | | | | BRANCH OUTPUTS | | |
|---|---|---|---|---|---|---|---|---|---|---|---|
| $S_1$ | $S_2$ | $S_3$ | $S_4$ | $S_5$ | $S_6$ | $S_7$ | $S_8$ | $S_9$ | A | B | C |
| 0 | 0 | 0 | 0 | 0 | 0 | 0 | 0 | 0 | 1 | 1 | 1 |
| 0 | 0 | 0 | 0 | 0 | 0 | 0 | 0 | X | 0 | 1 | 1 |
| 0 | 0 | 0 | 0 | 0 | 0 | 0 | X | 0 | 1 | 0 | 1 |
| 0 | 0 | 0 | 0 | 0 | 0 | X | 0 | 0 | 1 | 1 | 0 |
| 0 | 0 | 0 | 0 | 0 | X | 0 | 0 | 0 | 0 | 1 | 1 |
| 0 | 0 | 0 | 0 | X | 0 | 0 | 0 | 0 | 1 | 0 | 1 |
| 0 | 0 | 0 | X | 0 | 0 | 0 | 0 | 0 | 1 | 1 | 0 |
| 0 | 0 | X | 0 | 0 | 0 | 0 | 0 | 0 | 0 | 1 | 1 |
| 0 | X | 0 | 0 | 0 | 0 | 0 | 0 | 0 | 1 | 0 | 1 |
| X | 0 | 0 | 0 | 0 | 0 | 0 | 0 | 0 | 1 | 1 | 0 |

A comparison of the results presented in Table 3 with Table 1 reveals that data accumulation with respect to NOR gate A, B and C outputs of FIGS. 1 and 2 is the same as that accumulated with the invention of FIG. 3. In each case, as temperature increases, the respective NOR gate A, B and C outputs and branch A, B and C outputs become low or (0) in a sequence corresponding to the direction of temperature change, i.e., A to B, B to C and C to A, signifying increase, or "up" and B to A, A to C and C to B, signifying decrease, or "down." In FIG. 3, of course, *decreasing* temperature is indicated by clockwise rotation of arm 38 to close switches in a sequence from $S_1$ (high temperature) through $S_9$ (low temperature). A maximum temperature will be signaled by closing of $S_1$ and a minimum temperature by the closing of $S_n$ as indicated in FIG. 3.

It should be noted that direction sense may be reversed by interchanging any two of the three outputs A, B, C.

Figure 4:
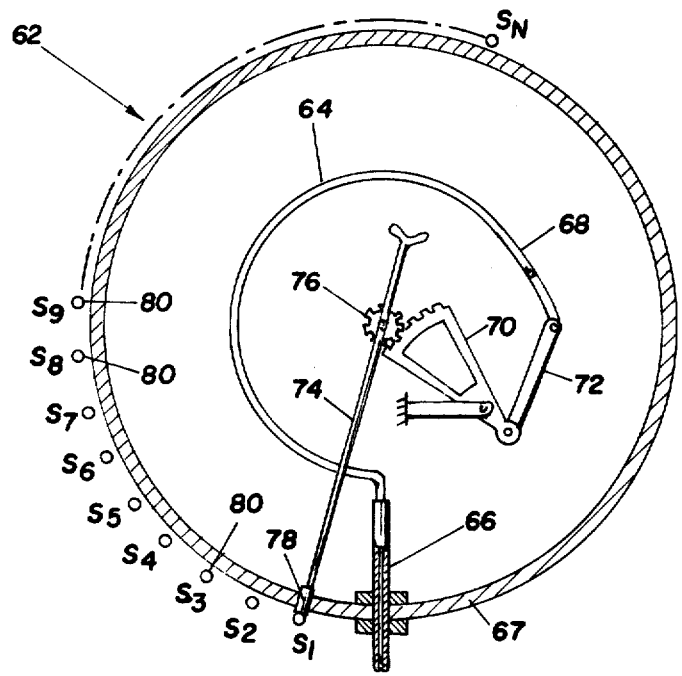
FIG. 4 is a diagrammatic plan view of a pressure sensing means of still another embodiment of the invention.
Figure 5:
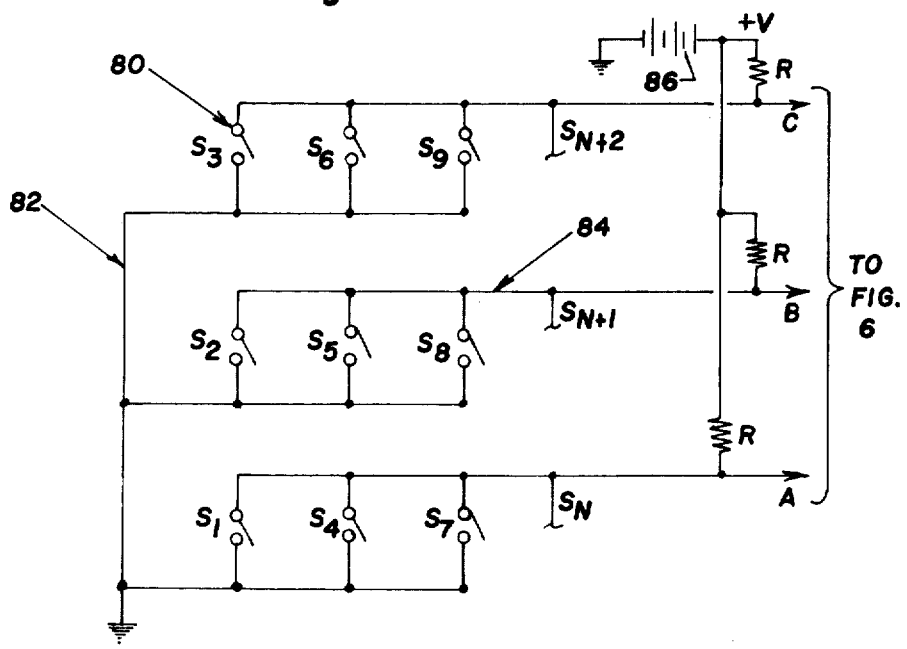
FIG. 5 is a schematic diagram of a three branch electric circuit of the invention of FIG. 4 or FIG. 3; and, FIG. 6 is a block diagram of a form of a prior art register and event-triggered binary coded counter which may be used with the present invention for accumulating and transmitting the accumulated incremental temperature data.

Referring now to FIGS. 4 and 5, a sensing device 62, utilized to sense changes in a variable quantity or condition such as pressure, has a Bourdon tube 64 which is fixed at one end 66 to the body 67 of sensor 62 and opened thereat to its pressure environment in a manner well known to the art. The opposite or free end 68 of tube 64 is connected to a sector gear or bell crank 70 by means of an articulated link or linking arm 72 attached thereto. A movable arm or pointer 74 rotatably fixed to a pin connected central pinion gear or cog wheel 76 and adapted to be rotated by bell crank 70, has a permanent magnet 78 fixed to its outer end. A series of magnetic reed switches 80, designated $S_1$ through $S_n$ (same as in FIG. 3), are positioned along the periphery of body 67 along a path traced by magnet 78 as it moves with pointer 74. Switches 80 are similar, or identical to switches 54 of FIG. 3 and positioned to be actuated or closed by magnet 78 as it comes into alignment proximate to a switch 80. When magnet 78 moves beyond a switch 80 it has actuated, the latter opens automatically.

Switches 80 are connected on one side to a ground circuit 82 and on the other side to a main or power circuit 84 which contains a power source or battery 86 and parallel connected pull-up resistors R. Circuit 84 is comprised of the same three parallel branches of FIG. 3 in which in each branch every third switch is parallel connected, as indicated in the FIG. 5 circuit diagram and has identical outputs A, B and C. It will be apparent from the foregoing that switching circuits 82 and 84 of FIG. 5 are substantially identical to circuits 58 and 56 of FIG. 3 and both will operate in the same way to produce a digital binary code of signals correspondingly the same. In fact, a truth table constructed for the FIGS. 4 and 5 embodiments will be the same in every respect to that of Table 3. Thus it will be realized that the invention herein has application to the measurement and detection of almost any variable quantity, entity or condition susceptible of charging wherein incremental data representative of that change is desired to be accumulated and transmitted to or from a remote location.

Figure 6:
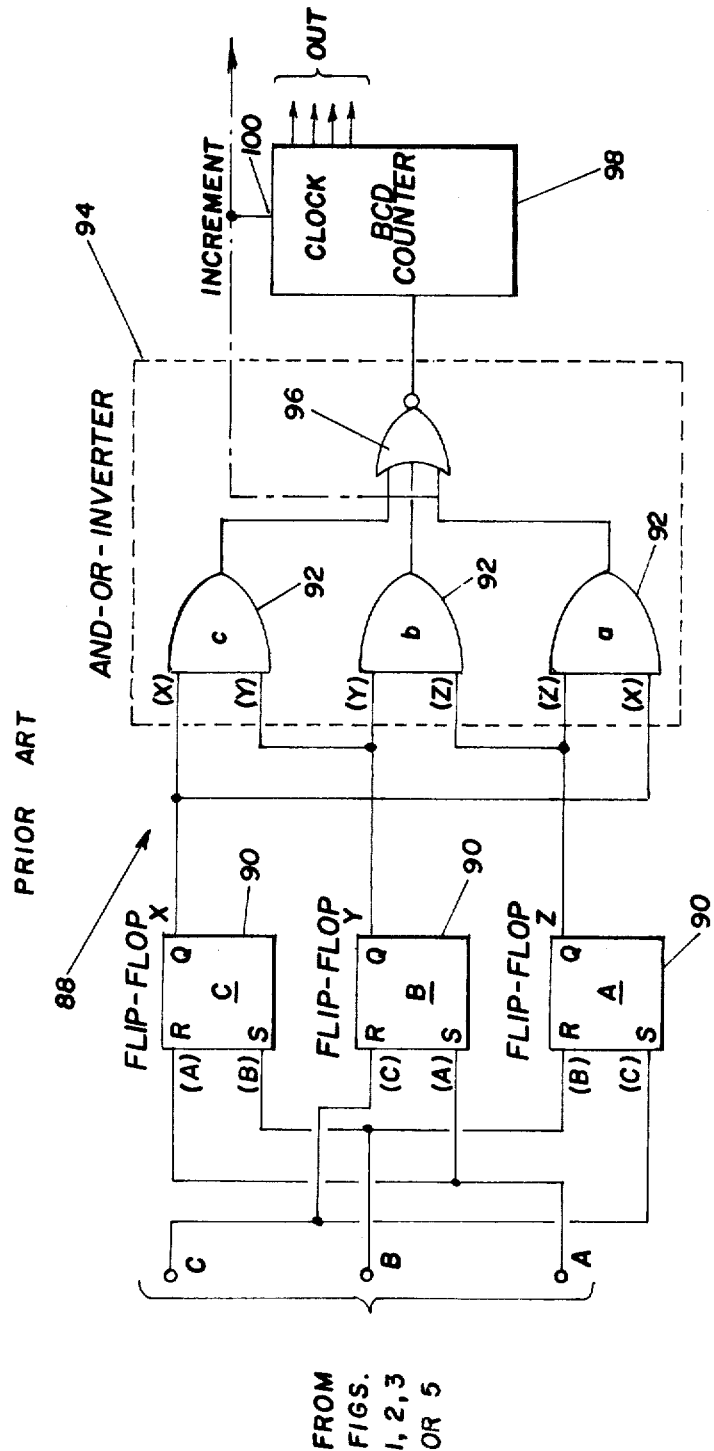

To accumulate the incremental data representative of changes in a quantity being measured by use of the present invention, and to transmit the same to another location, outputs A, B and C are connected to terminals A, B, and C of FIG. 6 which depicts, in block diagram, a data register and an event triggered binary coded decimal (BCD) counter telemetry system 88. Binary signals developed in any of the embodiments of FIG. 1, 2, 3 or 5 and produced at A, B and C thereof, can be connected to terminals A, B and C, respectively, of FIG. 6 to provide inputs to a set of bistable binary logic devices or elements in the form of flip-flop gates 90 in system 88. Logic elements or gates 90, designated A, B and C are preferably NAND gate flip-flops of the type made available by RCA, Inc. under the designation CD4044A and are also known as NAND R/S latches. They are reset-set types of bit storage devices wherein a binary (1) input to the "R", or reset input point results in an output, Q of first binary significance or (1). Conversely, if a (1) arrives at the "S", or set terminal, the device will have an output Q of (0). The functions for a flip-flop of this general type are given in Table 4 following:

TABLE 4

| R | S | Q |
|---|---|---|
| 0 | 0 | (indeterminate) |
| 0 | 1 | 0 |
| 1 | 0 | 1 |
| 1 | 1 | (no change) |

It should be noted that in normal practice, the devices are connected in such a manner that the "indeterminate" condition is never encountered.

Each terminal A, B and C of FIG. 6 is connected to an R or S terminal of two flip-flops 90 (one for each output A, B and C of the FIG. 1, 2, 3, or 5 inventions), so that the resultant stored bit of data information in each flip-flop 90 is determined by two different outputs A, B or C, as follows with reference to FIG. 6;

Terminal A: connected to R of C and S of B;
Terminal B: connected to R of A and S of C;
Terminal C: connected to R of B and S of A.

From this it can be seen that each output of the NOR gates of FIG. 1 or 2, or each output of the branches of FIG. 3 or 5 is connected to the R terminal of one flip-flop 90 and to the S terminal of one other flip-flop 90.

For purposes of ease and convenience in description, only three flip-flops 90 are used and the stored data bit in the form of a binary signal, available at the Q output terminal of each flip-flop 90 is determined by two consecutive A, B or C outputs or by two consecutive switches T with reference to the invention of FIG. 1 or 2, or S switch branches with reference to FIG. 3 or 5. Thus, together the Q (X, Y and Z) outputs of the flip-flops 90 constitute a three digit binary code that indicates the direction in which the quantity being measured is varying. These results are presented in Table 5 which is a truth table of the functions for all outputs A, B and C and flip-flops 90.

TABLE 5

| OUTPUT-NOR GATES/ BRANCHES | | | OUTPUTS RS FLIP-FLOPS 90 | | | |
|---|---|---|---|---|---|---|
| A | B | C | X | Y | Z | |
| 0 | 1 | 1 | 0 | 1 | no change | |
| 1 | 0 | 1 | 1 | 1 | 0 | |
| 1 | 1 | 0 | 1 | 0 | 1 | Increasing |
| 0 | 1 | 1 | 0 | 1 | 1 | Quantity |
| 1 | 0 | 1 | 1 | 1 | 0 | ↓ |
| 1 | 1 | 0 | 1 | 0 | 1 | ↓ |
| 0 | 1 | 1 | 0 | 1 | 1 | ↓ |
| 1 | 1 | 0 | 0 | 0 | 1 | |
| 1 | 0 | 1 | 1 | 0 | 0 | Decreasing |
| 0 | 1 | 1 | 0 | 1 | 0 | Quantity |
| 1 | 1 | 0 | 0 | 0 | 1 | ↓ |
| 1 | 0 | 1 | 1 | 0 | 0 | ↓ |
| 0 | 1 | 1 | 0 | 1 | 0 | ↓ |

Each output Q (X, Y or Z) of the flip-flops 90 is connected to an input terminal of two of three AND gates 92 (a, b and c) contained in an AND-OR-INVERTER 94. The outputs of AND gates 92 are connected as inputs to the NOR gate 96, also contained in AND-OR-INVERTER 94, the nature of which [whether (0) or (1)] is determined by the combination of Q (X, Y or Z) signals each AND gate is receiving at that time. Hence, the nature of the three digit binary code supplied to NOR gate 96 by AND gates 92 can indicate whether the temperature (FIG. 1, 2 or 3) or pressure (FIG. 5) is rising or falling. For example, the presence of a two (1)'s in the three digit output code could indicate a rising temperature or pressure and the presence of two (0)'s indicate a falling temperature. These functions are presented in the truth table therefor, Table 6.

TABLE 6

| FLIP-FLOP 90 OUTPUTS | | | - INVERTER - | | | | |
|---|---|---|---|---|---|---|---|
| | | | AND GATES 92 | | | NOR GATE | |
| X | Y | Z | a | b | c | 96 | |
| 0 | 1 | — | 0 | — | 0 | — | |
| 1 | 1 | 0 | 1 | 0 | 0 | 0 | |
| 1 | 0 | 1 | 0 | 0 | 1 | 0 | Increasing |
| 0 | 1 | 1 | 0 | 1 | 0 | 0 | ↓ |
| 1 | 1 | 0 | 1 | 0 | 0 | 0 | ↓ |
| 1 | 0 | 1 | 0 | 0 | 1 | 0 | ↓ |
| 0 | 1 | 1 | 0 | 1 | 0 | 0 | ↓ |
| 0 | 0 | 1 | 0 | 0 | 0 | 1 | |
| 1 | 0 | 0 | 0 | 0 | 0 | 1 | |
| 0 | 1 | 0 | 0 | 0 | 0 | 1 | |
| 0 | 0 | 1 | 0 | 0 | 0 | 1 | Decreasing |
| 1 | 0 | 0 | 0 | 0 | 0 | 1 | ↓ |
| 0 | 1 | 0 | 0 | 0 | 0 | 1 | ↓ |

NOR gate 96 output is connected to the input of a binary coded decimal (BDC) counter 98 and supplies an input signal thereto. Whether the signal supplied is high (1) *add* or low (0) *subtract* is determined by the binary code. Counter 98 has an increment or clock input 100 which is produced by sensing the change in current drain of the AND-OR-INVERTER gate 94, as a result of a change from a high to a low or vice versa of any of the inputs from X, Y, Z. Counter 98 counts and records the signals received as high (1) or low (0) indicating a change, i.e., a rise or fall in the quantity, i.e., temperature or pressure, being measured. The stored binary information can be automatically transmitted or telemetered if desired, which transmission will be initiated only when a change occurs which is sensed. Reference to co-assigned U.S. Pat. No. 4,061,901, incorporated herein by reference, can be had for a more detailed description of this aspect of the invention.

The invention having been disclosed in its preferred, best mode and in several other embodiments will be used by those skilled in the art to which it pertains in many areas, in fact, wherever it is desired to accumulate and telemeter quantitative data relating to any variable quantity, entity or condition, e.g., temperature or pressure, at very precise intervals or increments. Examples of such utility will be found in devices for determining freezing points or flash points of fluids and the like. The use of mercury thermometer 10 permits high accuracy of increment detection, excellent reproducibility of results and is easily calibrated using standard calibration procedures. When connected to a register and an event triggered telemetry system as described herein and incorporated by reference U.S. Pat. No. 4,061,901, each switch closure, FIGS. 1 and 2, or switch branch closure, FIGS. 3 and 5, will increment or decrement an accumulator and cause the accumulated incremental value to be transmitted, with no transmissions being initiated unless a change occurs. Furthermore, with no mechanical linkage between the moving elemental switching devices and the accumulator being required, the invention is inherently simple using only low cost, standard electrical circuit components permitting economic gains in production to be made. Also, power requirements to operate the invention are very low since no zero standby power drain for the sensors occurs and full power is used only when an incremental change in quantity is sensed.

In addition, system hysteresis is inherent since an increment is accumulated only upon successive contact (wetting) or decontact (dewetting) of two adjacent contacts or conductors (repeated wetting and dewetting of the same contact produces no net change).

Finally, economic gains are afforded since all logic gates and elements are standard CMOS and the resistors are standard carbon composition types.

What is claimed is:

1. A remote sensing and data accumulating system for detecting changes in temperature and producing logic signals of different binary significance as inputs to an incremental data accumulator comprising:
   (a) power supply means for supplying said input signals;
   (b) sensing means including a thermal bimetal element having a fixed end and a free end, said free end being movable responsive to changes in said temperature, producing movement in said free end, said movement in one direction indicating an increase in, temperature and in a different direction indicating a decrease in temperature, a movable arm carried connected to said element including magnetic means movable therewith, means for attaching said arm to said element, means for converting movement of said free end into rotational movement of said arm and magnetic means;
   (c) a plurality of electrically groundable magnetic switches disposed in fixed relation to said sensing means and positioned to be serially actuated by said magnetic means to close and actuate an electrical circuit, the closing of said circuit providing a binary signal of one significance, and said switches serially actuated by said magnetic means to open said circuit, the opening of said circuit providing a binary signal of a significance different than said closing signal significance;
   (d) circuit means electrically coupling said groundable switches and the input signals from said power supply means for distributing said binary signals; and,
   (e) logic circuit means connected to said groundable switches in binary input signal receiving relation including a plurality of multiple input logic gates for providing selected binary output signals which are representative in a sequence corresponding to the direction of increase or decrease in said temperature, each of said gates producing a single binary output which may be either of first or second binary significance, said output being of first binary significance only when one of said input signals is of one of said first and second binary significances and all of said other input signals are the other of said first and second binary significances said gates arranged in said circuit means in a sequence of a first to a last gate in order, said first gate of said sequence having a grounded input and at least one additional input connected to said power supply means through a load resistor for producing a binary input signal of said first binary significance, said remaining gates in said sequence each having an input connected to said additional input of a gate preceding it and an additional input connected to said power supply means through a load resistor and to said groundable switches, whereby said input is held at a value of first binary significance until grounded and said value of first binary significance is changed to a value of second binary significance.

2. A sensing and data accumulating system as specified in claim 1 in which the thermal bimetal element is a thermal Bourdon tube having a fixed end and a free end, said free end having movement in response to changes in temperature in said one direction in accordance with increasing temperature and in said different direction in accordance with decreasing temperature.

3. A sensing and data accumulating system as specified in claim 1 in which the thermal element is a bimetallic strip.

4. A sensing and data accumulating system as specified in claim 1 wherein the outputs of said logic gates of said plurality of gates are inputs connected to bistable elements, each of said elements having a set state and a reset state, input points for receiving said binary signals from said logic gates to place said element in said set and reset states, and at least one output point for producing an output, said output in one of said set and reset states having a binary value of first or primary binary significance and said output in the other said set and reset states having a binary value of second or secondary binary significance.

5. A sensing and data accumulating system as specified in claim 4 wherein said output is of said first binary significance in said reset state.

6. A sensing and data accumulating system as specified in claim 4 wherein the bistable elements are flip-flops and said logic circuit means includes at least one pull-on resistor connected to said flip-flop reset inputs to produce said reset input signal of first binary significance placing said flip-flops in said reset states.

7. A sensing and data accumulating system as specified in claim 6 wherein said flip-flops are NAND gate flip-flops.

8. A sensing and data accumulating system as specified in claim 4 wherein said outputs of said bistable elements provide a multi-digit binary code based on the number of binary signals of first and second significance present, said code being capable of distinguishing the direction of variation in said variable quantity, an increasing direction being signified by the pressure of more signals of one of said first and second binary significances and decreasing direction being signified by the presence of more signals of the other of said first and second binary significances.

9. A sensing and data accumulating system as specified in claim 8 wherein said increasing direction is signified by the presence in said code of more signals of first binary significance than signals of second binary significance.

10. A sensing and data accumulating system as specified in claim 4 further including register and binary counter means in said logic circuit means, said register means connected to said bistable elements in element output receiving relation, said register comprising:
   (a) a first logic gate means having inputs connected to at least two of said element outputs and at least one output, said output being a binary signal of first binary significance only when all of said gate inputs are binary signals of first binary significance; and
   (b) second logic gate means having inputs connected to the outputs of said first logic gate means and having a single output, said output being a binary signal of first binary significance whenever a binary signal of first binary significance is present at any one or all of said inputs of said inputs of said second logic gate means; and,
   said binary counter means having an input connected to said output of said second logic gate means and an increment or clock pulse input operatively connected to said sensing means for recording and counting said binary signals and indicating the amount of increase or decrease of said variable quantity.

11. A sensing and data accumulating system as specified in claim 10 wherein said first logic gate means is a plurality of AND gates.

12. A sensing and data accumulating system as specified in claim 10 wherein said second logic gate means is an OR gate.

13. A sensing and data accumulating system as specified in claim 10 wherein said binary counter means is an up-down counter.

14. A sensing and data accumulating system as specified in claim 4 further including register and binary counter means in said logic circuit means, said register means connected to said bistable elements in element output receiving relation, said register comprising:
   (a) a first logic gate means having inputs connected to at least two of said element outputs and at least one output, said output being a binary signal of first binary significance only when all of said gate inputs are binary signals of first binary significance; and
   (b) second logic gate means having inputs connected to the outputs of said first logic gate means and having a single output, said output being a binary signal of first binary significance whenever a binary signal of second binary significance is present at all of said inputs of said second logic gate means; and,
   said binary counter means having an input connected to said output of said second logic gate means and an increment or clock pulse input operatively connected to said sensing means for recording and counting said binary signals and indicating the amount of increase or decrease of said variable quantity.

15. A sensing and data accumulating system as specified in claim 14 wherein said second logic gate means is a NOR gate.

16. A sensing and data accumulating system as specified in claim 1 wherein said plurality of logic gates are Exclusive-OR gates.

17. A sensing and data accumulating system as specified in claim 1 further including an additional plurality of logic gates in said logic circuit means, each of said additional gates having at least two inputs, said inputs for each additional gate being the outputs of at least two different ones of said gates connected to said power supply, said additional gates each producing a single output signal which has a binary value of first binary significance only when all of said additional gate inputs have a binary value of second binary significance, and further including a plurality of bistable elements in said logic circuit means, each of said elements having a set input point and reset input point for placing said elements in a corresponding set and reset state and at least one output point, said output producing a binary value of first binary significance when said element is in one of said reset and set states and a binary value of second binary significance when said element is in the other of said reset and set states, each of said input points of said elements being connected to the output of a different one of said additional gates, said outputs providing selected binary signals of first and second binary significance in a multi-digit binary code based on the number of said binary signals of first and second significance which are present, said code capable of distinguishing the direction of variation of said variable quantity, increasing quantity being signified by the presence in said code of more signals of one of said first and second binary significances than signals of the other of said first and second binary significances.

18. A sensing and data accumulating system as specified in claim 17 wherein said element output is of first binary significance when said element is in said reset state.

19. A sensing and data accumulating system as specified in claim 17 wherein sid bistable elements are NAND R/S flip-flops.

* * * * *